United States Patent
Miyanaga et al.

(10) Patent No.: US 6,544,917 B1
(45) Date of Patent: Apr. 8, 2003

(54) $Si_3N_4$ CERAMIC, Si-BASE COMPOSITION FOR ITS PRODUCTION, AND METHOD FOR ITS PRODUCTION

(75) Inventors: Michimasa Miyanaga, Itami (JP); Seiji Nakahata, Itami (JP)

(73) Assignee: Sumitomo Electric Industries, Ltd., Osaka (JP)

(*) Notice: Subject to any disclaimer, the term of this patent is extended or adjusted under 35 U.S.C. 154(b) by 156 days.

(21) Appl. No.: 09/655,713

(22) Filed: Sep. 5, 2000

(30) Foreign Application Priority Data

Sep. 6, 1999 (JP) .......................... 11-252056

(51) Int. Cl.⁷ .......................... C04B 35/16; C04B 35/00
(52) U.S. Cl. ........................... 501/154; 501/97.2
(58) Field of Search ............... 501/97.1, 97.2, 501/152, 154; 264/86

(56) References Cited

U.S. PATENT DOCUMENTS

| | | | |
|---|---|---|---|
| 4,471,060 A | | 9/1984 | Dickie et al. ............... 501/151 |
| 4,482,388 A | * | 11/1984 | Crosbie ................... 106/287.1 |
| 4,519,967 A | * | 5/1985 | Crosbie et al. ............. 264/301 |
| 4,623,498 A | * | 11/1986 | Beckwith et al. ........... 264/344 |
| 4,975,395 A | * | 12/1990 | Lumby et al. .............. 501/96.1 |
| 5,011,669 A | * | 4/1991 | Tsuchiya et al. ........... 423/338 |
| 5,028,362 A | * | 7/1991 | Janney et al. .............. 264/109 |
| 5,030,434 A | * | 7/1991 | Pitzer et al. ................ 423/344 |
| 5,055,432 A | | 10/1991 | Edler et al. .................... 501/97 |
| 5,069,839 A | * | 12/1991 | Grote et al. ................ 264/166 |
| 5,126,295 A | * | 6/1992 | Uchino et al. .............. 423/344 |
| 5,164,346 A | * | 11/1992 | Giunchi et al. ............ 501/95.2 |
| 5,166,106 A | * | 11/1992 | Edler et al. ................. 423/353 |
| 5,182,239 A | * | 1/1993 | Hirokawa et al. .......... 264/117 |
| 5,213,729 A | * | 5/1993 | Edler et al. ................. 264/639 |
| 5,298,470 A | * | 3/1994 | Chia et al. .................... 501/89 |
| 5,322,821 A | * | 6/1994 | Brezny ....................... 501/103 |
| 5,340,561 A | * | 8/1994 | Baldus et al. ............... 423/324 |
| 5,384,290 A | * | 1/1995 | Brezny ......................... 264/43 |
| 5,387,562 A | * | 2/1995 | Dillinger et al. ........... 501/97.2 |
| 5,405,592 A | * | 4/1995 | Edler et al. ................. 423/344 |
| 5,538,927 A | * | 7/1996 | Tsuzuki et al. ............. 423/344 |
| 5,571,760 A | * | 11/1996 | Pujari et al. ................ 501/97.2 |
| 5,585,084 A | * | 12/1996 | Yamada et al. ............. 423/344 |
| 5,662,824 A | * | 9/1997 | Sang et al. ................. 252/65.52 |
| 5,716,670 A | * | 2/1998 | Park et al. .................. 423/344 |
| 5,744,410 A | * | 4/1998 | Komatsu et al. ........... 501/97.2 |
| 5,744,411 A | * | 4/1998 | Zhao et al. ............... 156/89.27 |
| 6,007,883 A | * | 12/1999 | Foster et al. ............... 428/34.1 |
| 6,143,677 A | * | 11/2000 | Miyanaga et al. .......... 264/647 |
| 6,221,921 B1 | * | 4/2001 | Lombardi et al. ..... 106/287.11 |
| 6,242,374 B1 | * | 6/2001 | Komatsu .................... 264/683 |
| 6,284,690 B1 | * | 9/2001 | Nakahata et al. .......... 501/97.1 |

FOREIGN PATENT DOCUMENTS

| | | |
|---|---|---|
| DE | 19611651 A1 | 10/1997 |
| EP | 0774449 A2 * | 5/1997 |
| JP | 1-212279 | 8/1989 |
| JP | 3-261662 | 11/1991 |
| JP | 2686248 | 8/1997 |

OTHER PUBLICATIONS

Schneider, Jr., Samuel J. (chairman) et al., "Ceramics and Glasses," 1991, Engineered Matrerials Handbook vol. 4, ASM International, pp. 102.*

European Search Report Nov. 20, 2000.

* cited by examiner

Primary Examiner—Tom Dunn
Assistant Examiner—Colleen P. Cooke
(74) Attorney, Agent, or Firm—McDermott, Will & Emery

(57) ABSTRACT

The invention provides a slurry composition suitable for the manufacture of $Si_3N_4$ sintered bodies, wherein the dispersion properties and oxidation resistance of Si powder in water are improved, resulting in the homogenous dispersion of a sintering aid powder and a fine Si powder with less oxygen. Si powder, a sintering aid, water in an amount of 50 to 90 wt % relative to the total weight of the composition, and a surface coating agent in an amount of 0.05 to 10 wt % relative to the Si powder are added, the pH is adjusted to between 3 and 8, and the ingredients are milled and mixed. Trivalent metal ions such as Fe or Ga, or a polysiloxane with a BHL of no more than 10 is used as the surface coating agent. The resulting slurry composition can be used to prepare $Si_3N_4$ sintered bodies with better electrical, thermal, and mechanical properties.

12 Claims, 2 Drawing Sheets

SI₃N₄ CERAMIC, SI-BASE COMPOSITION FOR ITS PRODUCTION, AND METHOD FOR ITS PRODUCTION

BACKGROUND OF THE INVENTION

1. Field of the Invention

The present invention relates to a Si-base composition in the form of a slurry comprising water as the dispersion medium, which is used to produce silicon nitride ($Si_3N_4$) ceramics, as well as the high strength $Si_3N_4$ ceramics produced from the Si-base composition in the form of a slurry, and a method for producing them.

2. Description of the Related Art

To produce $Si_3N_4$ ceramics having good electrical, thermal, and mechanical properties, it is essential to prepare a precursor (slurry composition) comprising the uniform dispersion and mixture of a fine, high purity starting material powder and other additives.

Alcohols have been used as dispersion media to improve the dispersion properties of the Si powder and to control oxidation at the surface of the Si powder when $Si_3N_4$ ceramics are produced from slurry compositions comprising silicon (Si) powder starting material. However, processes featuring the use of alcohols suffer from problems in terms of the cost of the product, such as the need to use expensive explosion-proof facilities.

The ability to use water as the dispersion medium, on the other hand, would eliminate the need for explosion-proof facilities, and would allow $Si_3N_4$ ceramics to be produced at a lower cost. Examples of existing means for using water as a dispersion medium have been given in Japanese Laid-Open Patent Applications (Kokai) 3-261662 and 1-212279, Japanese Patent 2686248, and U.S. Pat. No. 5,387,562.

Among these slurry compositions comprising water as a dispersion medium and the methods for producing $Si_3N_4$ ceramics using such compositions, no sintering aid necessary for the compaction of the ceramic is added to the slurry in the methods given in Japanese Laid-Open Patent Applications (Kokai) 3-261662 and 1-212279. The resulting $Si_3N_4$ sintered body thus contains an abundance of small gas holes dispersed throughout. As a result, the $Si_3N_4$ sintered body has an extremely low flexural strength of no more than 600 MPa. No sintering aid is added to the slurry in these methods because the dispersion properties between the Si powder and sintering aid are not very good in water, resulting in a decline in the inherently outstanding properties of $Si_3N_4$.

U.S. Pat. No. 5,387,562 discloses means for adjusting the pH to the alkaline end of the scale in order to improve the dispersion properties between the Si powder and sintering aid in water. That is, sintering aids $Y_2O_3$ and $Al_2O_3$ are added to Si powder pre-milled in an organic solvent or to Si powder preheated in a 200 to 300° C. gas, and the ingredients are mixed in alkaline water with a pH of 11 to 13. Alternatively, a Si powder containing the same sintering aids is heated in air in the same manner as above, and the ingredients are then similarly mixed in alkaline water. The water content of the slurries in these methods is no more than 50 wt %.

However, in the method disclosed in the U.S. patent, the Si powder is milled in an organic solvent such as an alcohol, making it necessary to subsequently oxidize the surface in air. When the Si powder is milled all at once in the water, the surface of the fine, active particles gradually forms a $SiO_2$ film as a result of dehydration, while the reaction is accelerated as the mean particle size of the Si powder becomes smaller. Therefore, with reduction in Si particle size, Si particles thus tend to aggregate in the slurry during or after the milling process for producing the fine Si particles, and thus prevents a slurry with good dispersion properties from being obtained, while also causing the resulting sintered body to suffer deterioration of properties, poor coloration, and the like. Since the water content of the slurry is no more than 50 wt %, as noted above, the composition sometimes becomes non-homogeneous when prepared.

Japanese Patent 2686248 discloses a method in which 50 to 90 wt % water and as much as 7.5 wt % of a sintering aid, as calculated in terms of oxides, are added to a Si powder preheated to between 200 and 800° C. in the atmosphere, and a small amount of a dispersion agent such as an ammonium polycarboxylate is also added to adjust the pH of the slurry to an alkalinity of between 8 and 12. However, since the Si particles are similarly dispersed in water in this method as well, the surface must be pre-oxidized.

In conventional methods for preparing slurries for the manufacture of $Si_3N_4$ ceramics in this manner, it is impossible to simultaneously control the oxidation of the Si powder and improve the dispersion properties of the fine Si powder in aqueous solvent, as long as water is used as the dispersion agent. Not only is it difficult to handle the fine Si powder, but it is also necessary to employ at least some economically disadvantageous means such as oxidation of the Si powder in air.

SUMMARY OF THE INVENTION

In view of the foregoing, an object of the present invention is to improve the oxidation resistance and dispersion properties of Si powder in water so as to provide a Si-base composition in the form of a slurry suitable for the manufacture of $Si_3N_4$ ceramics, as well as an inexpensive manufacturing method. Another object of the present invention is to provide $Si_3N_4$ ceramics with better electrical, thermal, and mechanical properties by using such a slurry Si-base composition.

To achieve the aforementioned objectives, the Si-base composition in the form of a slurry proposed in the present invention comprises a Si powder with a mean particle size of no more than 10 μm and a surface oxygen content of no more than 3 wt %, a sintering aid, water in an amount of 50 to 90 wt % relative to the total weight of the composition, and a surface coating agent in an amount of 0.05 to 10 wt % relative to the Si powder, wherein the pH is adjusted to between 3 and 8.

The surface coating agent in the aforementioned Si-base composition in the form of a slurry is trivalent metal ions of at least one selected from the group consisting of Fe, Ga, Sc, Al, Cr, Yb, Sm, Y, In, Pb, V, Ti, Zr, and Hf, or a Si polymer or polymeric compound with an HLB of no more than 10.

HLB is an abbreviation for hydrophile-lipophile balance, which represents the balance between the hydrophilic groups and lipophilic groups (hydrophobic groups) in the surface coating agent. The number of hydrophilic groups and number of lipophilic groups are determined based on the molecular structure, allowing the HLB to be calculated based on the following equation 1.

$$HLB = 7 + \Sigma \text{ (number of hydrophilic groups)} - \Sigma \text{ (number of lipophilic groups)} \quad \text{[Equation 1]}$$

DESCRIPTION OF THE PREFERRED EMBODIMENTS

A slurry that is suitable for producing a $Si_3N_4$ ceramic, and that comprises Si powder as a starting material, requires the Si powder and a sintering aid to be thoroughly mixed to homogeneity, while at the same time the Si powder that is ultimately obtained must have a mean particle size of no more than 10 μm, and preferably between 0.1 and 2 μm, and a surface oxygen content of no more than 3 wt %, and preferably no more than 1.5 wt %.

A Si powder with a mean particle size greater than 10 μm will result in insufficient nitriding and sintering during sintering, making it difficult to obtain a $Si_3N_4$ sintered body with better electrical, thermal, and mechanical properties. A mean particle size of less than 0.1 μm will result in a powder with pronounced aggregation and oxidation, making densification difficult in the subsequent nitriding and sintering process. When the oxygen content of the surface (in this specification, referred to as "surface oxygen content") of the Si powder is greater than 3 wt %, such an excessive surface oxygen content interferes with the nitriding reaction, and tends to result in lower properties, poor coloration, and the like.

However, efforts to introduce fine Si powder into an aqueous solvent and to mill the powder in an aqueous solvent result in greater oxidation of the Si powder surface as a result of reaction with the water. Particularly when the pH of the aqueous solvent is 8 or more, the Si—O—Si bonds of the surface oxide film are broken by OH groups, accompanied by the break down and elution of the surface phase, resulting in the repeated formation of oxidation films on the newly exposed surface, and thereby gradually promoting oxidation as indicated in the chemical formulas 1 and 2 below. Therefore, the pH is desirably controlled to less than 8 in order to prevent the oxidation.

$Si+2H_2O \rightarrow SiO_2+2H_2$      [Chemical Formula 1]

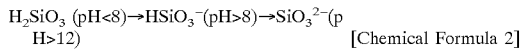

$H_2SiO_3$ (pH<8)$\rightarrow HSiO_3^-$(pH>8)$\rightarrow SiO_3^{2-}$(pH>12)      [Chemical Formula 2]

On the one hand, as reported in Japanese Patent 2686248, when the pH of the aqueous solvent is less than 8, the surface potential of the Si powder is either negative or zero, while the surface potential of the simultaneously added sintering aids (oxides such as $Y_2O_3$ and $Al_2O_3$) is positive, causing these powders to aggregate, which prevents a homogenous dispersion state from being obtained. Based on this information, simply adjusting the pH unavoidably results in the sacrifice of either the control of the oxidation of the Si powder or its dispersion properties. Otherwise, it has been necessary to subdivide the mixing and milling steps, such as milling the powder in an organic solvent and heating the powder in air, as in the aforementioned conventional techniques.

Figure 1:
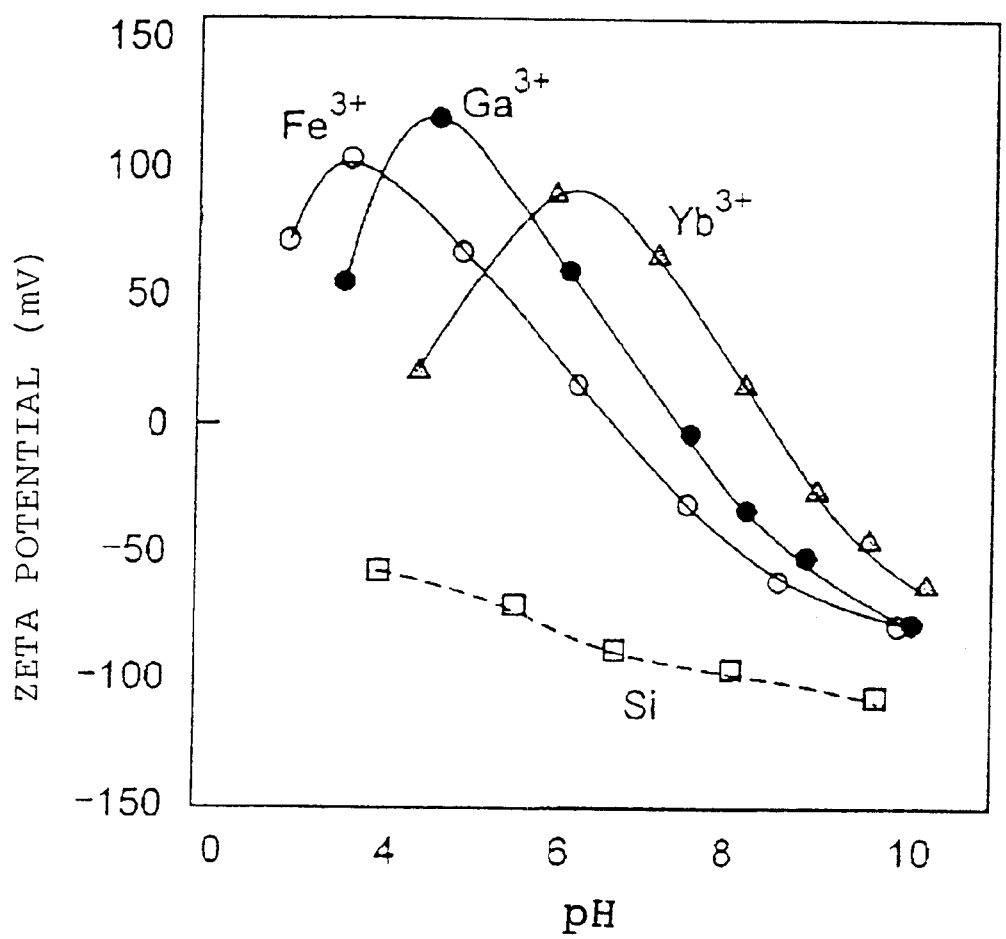
FIG. 1 is a graph illustrating the relationship between the pH and the surface potential of Si powder and a Si powder to which the metal ions of the surface coating agent have been adsorbed according to the present invention.

As a result of studies on the adsorption rate of various metal ions to Si powder surface in water, the inventors found that when certain metals selected from among metals which are adsorbed onto Si powder surface at a high adsorption rate are added to an aqueous solvent for use as a surface coating agent to be adsorbed to the surface of the Si powder, the exposed surface of Si powder can be prevented from coming into contact with water and the surface of oxidation of Si particles can be controlled. As shown in FIG. 1, the metal ions of the surface coating agent adsorbed to the surface of the Si powder changes the surface potential of the powder, resulting in a high positive potential, even at a pH of 8 or less, so that the Si powder can be prevented from aggregating together or with the sintering aid, and a uniformly dispersed slurry can be obtained. Trivalent metal ions are examples of such a surface coating agent, among which trivalent cations selected from Fe, Ga, Sc, Al, Cr, Yb, Sm, Y, In, Pb, V, Ti, Zr, and Hf in particular are preferred.

Figure 2:
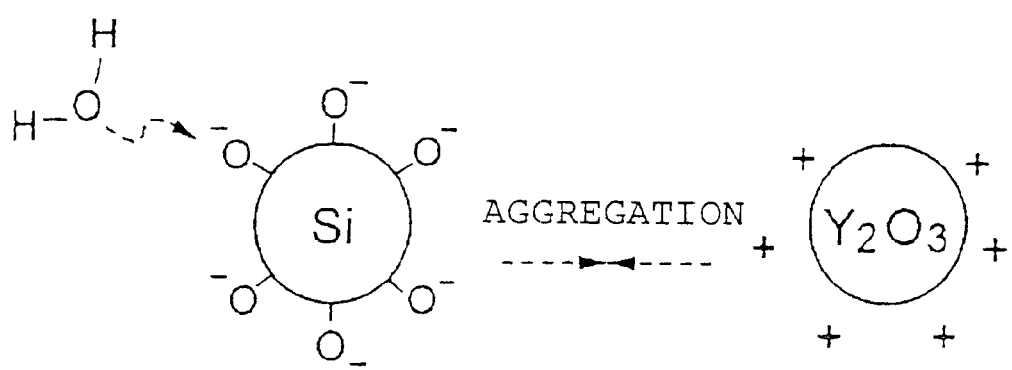
FIG. 2 is a schematic diagram illustrating the aggregation of Si powder and a $Y_2O_3$ powder sintering aid when no surface coating agent according to the present invention has been added.
Figure 3:
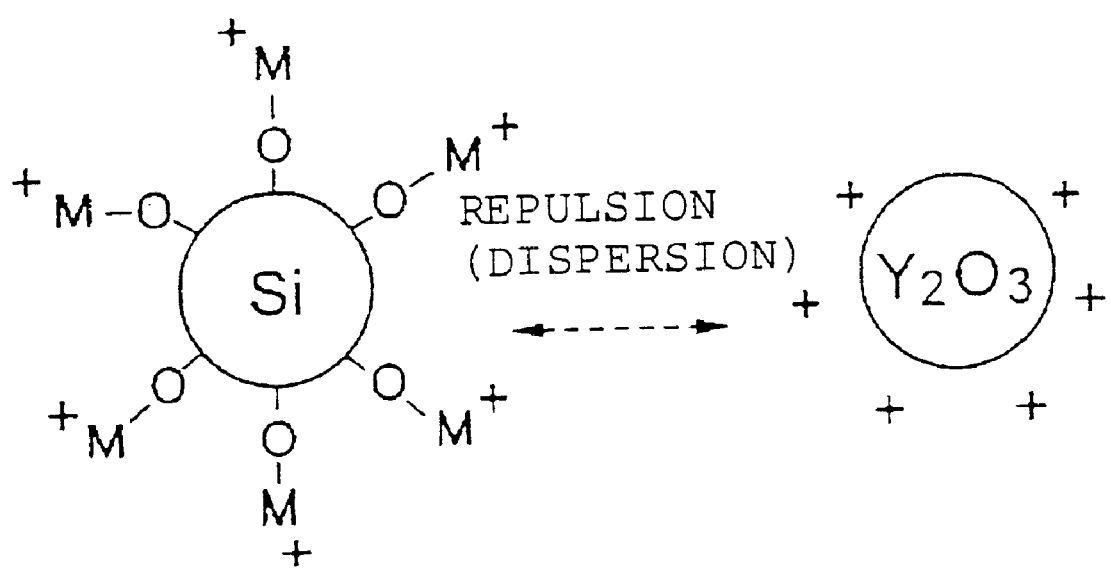
FIG. 3 is a schematic diagram illustrating the dispersion of Si powder and the $Y_2O_3$ powder sintering aid when a surface coating agent according to the present invention has been added.

The action of surface coating agents comprising trivalent metal ions is illustrated by FIGS. 2 and 3, which depict the state of the Si powder and sintering aid ($Y_2O_3$) in an aqueous solvent. As shown in FIG. 2, when the aqueous solvent contains no surface coating agent, the surface of the Si powder results in a powder containing an excess of oxygen because it readily reacts with water. Si powder has a negative surface potential (zeta potential) in an aqueous solvent with a pH<8, but the simultaneously added sintering aid powder such as $Y_2O_3$ has a positive surface potential. That is, the opposite surface potentials of the Si powder and sintering aid powder tends to result in powder aggregation and the inability to achieve a good dispersion state. When metal ions (M) are added as the surface coating agent, the metal ions M rapidly bond to the groups on the surface of the Si powder, as shown in FIG. 3, controlling the reaction of the Si surface with the water when the powder is milled or mixed, and creating a positive surface potential, so as to prevent aggregation with the sintering aid powder (repulsion) and afford a good dispersion state.

As the surface coating agent other than the aforementioned trivalent metal ions, Si polymers or polymeric compounds with an HLB of no more than 10 may also be used in the present invention, affording the same effects. Examples of such Si polymers and polymeric compounds include polysiloxanes, as well as polymeric compounds that contain any element from Si, Ti, Zr, and Hf, and that have both hydrophilic and hydrophobic (lipophilic) groups as their terminal groups. An HLB greater than 10 results in a slower adsorption rate or less adsorption of the polymeric compounds to the surface of the Si particles, and sometimes fails to provide satisfactory action and effect derived from the adsorption to the surface of the Si particles.

The action of Si polymers or polymeric compounds as the surface coating agent is considered as follows. When, for example, a polysiloxane with terminal groups converted to alkyl groups such as methyl so as to have an HLB of no more than 10 is used, it is believed that the hydrophilic groups (silanol group: Si—OR) undergo condensation reaction by combining with the OH groups on the surface of the Si particles (represented as Si*) at a pH of 8 or below, as indicated in the following chemical formula 3, thereby inhibiting the oxidation of the surface of the Si particles by water, and that the surface potential of the hydrophobic groups (represented by X) is changed, allowing the particles to be prevented from aggregating.

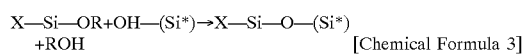

X—Si—OR+OH—(Si*)$\rightarrow$X—Si—O—(Si*)+ROH      [Chemical Formula 3]

When the slurry composition containing the Si powder is prepared in the present invention, a Si powder, a sintering aid, and a surface coating agent, in an amount of 0.05 to 10 wt % relative to the Si powder, is added to water in an amount of 50 to 90 wt % relative to the total composition, the pH is adjusted to between 3 and 8, and the powders are milled and mixed until the target mean particle size is achieved. The mean particle size of the Si powder that is ultimately obtained should be no more than 10 µm, as noted above, and is more preferably between 0.1 and 2 µm. The final surface oxygen content of the Si powder should be no more than 3 wt %, and more preferably no more than 1.5 wt %. Although the means for milling the powder is not particularly limited, a ball mill can be used, for example, to simultaneously mix and mechanically mill the powder while controlled by the rotating time of the mill until the particle size is within the prescribed range.

The surface coating agent that may be added is at least one of compounds containing the aforementioned trivalent metal ions, specifically nitrate, chloride, or acetate containing at least one element selected from among Fe, Ga, Sc, Al, Cr, Yb, Sm, Y, In, Pb, V, Ti, Zr, and Hf, or a Si polymer such as a polysiloxane with an HLB of no more than 10, or a polymeric compound that contains any element from Si, Ti, Zr, and Hf, and that has both hydrophilic and hydrophobic (lipophilic) groups as terminal groups. Adding the surface coating agent in an amount less than 0.05 wt % is insufficient to cover the surface of the Si powder, and will thus fail to provide satisfactory effects in suppressing oxidation. An addition of more than 10 wt % of the surface coating agent, on the other hand, will increase the viscosity of the slurry and cause aggregation of the surface coating agent.

When water, which is the dispersion medium, is used in an amount less than 50 wt % of the total composition, the slurry viscosity increases significantly, preventing a homogenous mixture from being achieved, whereas more than 90 wt % makes it difficult to form a slurry composition into a shaped article. A pH higher than 8 results in elution of the oxide surface layer or the surface coating agent from the Si powder, thus preventing oxidation of the surface of the Si powder from being suppressed. A pH of less than 3, on the other hand, increases the slurry viscosity, and does not allow the powders to be sufficiently milled and mixed.

A sintering aid can also be added to the slurry composition in the present invention and homogeneously dispersed with the Si powder. Oxides, nitrides, and oxynitrides of at least one element selected from Ca, Sr, Mg, Al, Y, La, Sm, Nd, Yb, and Ce, or their precursors or complexes can be used as the sintering aid. The sintering aid should be added in an amount ranging from 0.2 to 20 wt %, as calculated in terms of oxides. An addition of less than 0.2 wt % makes it difficult to produce a densified sintered body or makes it necessary to increase the sintering temperature needed for densification of the sintered body. More than 20 wt %, on the other hand, tends to promote the growth of particles, thereby lowering the mechanical strength.

Coating the surface of the Si powder with the above-mentioned ions or polymers, which are rapidly adsorbed onto the Si particles and added as a surface coating agent in accordance with the present invention, will suppress oxidation of the Si powder in water, while improving the dispersibility of the powders at a pH of no more than 8. As a result, it is possible to obtain a Si-base composition in the form of a slurry in which the sintering aid is uniformly dispersed with a fine Si powder having less oxidation on the particle surface. Furthermore, neither pre-oxidation of, the Si powder nor pre-milling in an organic solvent is required to prepare the Si-base composition, and its excellent productivity allows an inexpensive Si-base composition to be offered.

A common acrylic or other organic binder can also be added and mixed, either simultaneously or afterward, to the slurry Si-base composition of the present invention. The addition of an organic binder allows the composition to be molded as the slurry moisture is dehydrated at reduced pressure. The slurry can be applied to the surface of a porous element or the like, and dried into the form of a sheet. In addition to the aforementioned organic binder, a PVA or stearic acid, etc. can be added and mixed at the same time. In such cases, a spray dryer or the like can be used to dry and granulate the slurry, and the resulting dried powder can be used for dry forming. The organic binder should be added in an amount ranging from 0.01 to 6 wt % relative to the Si powder. Adding less than 0.01 wt % sometimes fails to provide satisfactory effects, whereas more than 6 wt % increases the viscosity of the slurry and makes it difficult to handle.

The molded product obtained through the aforementioned processes can be treated to remove the binder, and then heated and fired in a nitrogen atmosphere to obtain a $Si_3N_4$ ceramic. The resulting $Si_3N_4$ ceramic will have a uniform, densified, defect-free structure and a fine-grained texture, which will readily demonstrate high strength. Since defects and impurities in the starting material particles can be minimized, the composition will be suitable for producing a $Si_3N_4$ ceramic with high thermal conductivity.

EXAMPLE 1

A commercially available Si powder with a mean particle size of 10 µm was added to water in an amount of 70 wt % relative to the total slurry, followed by the addition of $Y_2O_3$ powder and MgO powder as the sintering aid in amounts of 5 wt % each (total of 10 wt %) relative to the Si powder, the metal ion-containing nitrate or the polysiloxanes with differing HLB levels given in Table 1 below as the surface coating agent in amounts of 4 wt % relative to the Si powder, and an acrylic organic binder in an amount of 5 wt % relative to the Si powder. The ingredients were mixed, the resulting slurry was adjusted to a pH of 6, and the slurry was mixed and milled for 24 hours by a ball mill using $Si_3N_4$ balls.

The final Si powder in the slurry obtained after mixing was refined to a mean particle size of 1 µm in all samples. The surface oxygen content of the final Si powder in each sample was determined by a heating gas analyzer. The results are given in Table 1 below.

Slurries from the respective samples were then dried in a spray dryer to produce granules, which were then molded by dry pressing. The resulting moldings were subjected to nitriding by retaining the moldings at a temperature of 1200 to 1400° C. for 8 hours in a nitrogen atmosphere, and were then sintered for 3 hours at 1700° C. The resulting $Si_3N_4$ sintered bodies were then checked for relative density and for flexural strength by the three-point flexural test in accordance with JIS R1601. The results are summarized in Table 1.

Comparative examples were done in the same manner as the example above, except that divalent metal ion $Mg^{2+}$ was added as the surface coating agent in sample 8, polysiloxanes with an HLB greater than 10 were added in samples 12 and 13, no surface coating agent was used in sample 14, and no surface coating agent was added, while the pH was made alkaline with the addition of aluminum polycarboxylate as the dispersion agent in sample 15. The properties in these samples were assessed in the same manner as above, and the results are given in Table 1.

TABLE 1

| Sample | Surface Coating Agent | Final Si powder Particle Size (μm) | Surface oxygen content (wt %) | $Si_3N_4$ sintered body Density (%) | $Si_3N_4$ sintered body Strength (MPa) |
|---|---|---|---|---|---|
| 1 | $Fe^{3+}$ | 1 | 0.8 | 99 | 1250 |
| 2 | $Ga^{3+}$ | 1 | 1.0 | 99 | 1250 |
| 3 | $Sc^{3+}$ | 1 | 1.2 | 99 | 1150 |
| 4 | $Cr^{3+}$ | 1 | 1.5 | 99 | 1150 |
| 5 | $Yb^{3+}$ | 1 | 1.5 | 99 | 1100 |
| 6 | $Sm^{3+}$ | 1 | 1.5 | 99 | 1100 |
| 7 | $Y^{3+}$ | 1 | 1.2 | 99 | 1100 |
| 8* | $Mg^{2+}$ | 1 | 4.0 | 70 | 650 |
| 9 | polysiloxane (HLB 5) | 1 | 0.8 | 99 | 1350 |
| 10 | polysiloxane (HLB 7) | 1 | 1.0 | 99 | 1300 |
| 11 | polysiloxane (HLB 10) | 1 | 1.9 | 98 | 1050 |
| 12* | polysiloxane (HLB 15) | 1 | 4.0 | 75 | 650 |
| 13* | polysiloxane (HLB 20) | 1 | 5.0 | 70 | 500 |
| 14* | none | 1 | 5.0 | 65 | 450 |
| 15* | none (dispersion agent added) | 1 | 4.5 | 80 | 550 |

(Note)
Samples with asterisks are comparative examples.

The results of Table 1 show that the addition of the surface coating agent according to the present invention suppressed oxidation of the fine Si powder, even when milled in water with a pH of 6, and gave a slurry Si-base composition in which the powders had been uniformly dispersed, and that such an Si-base composition afforded a $Si_3N_4$ sintered body with a high flexural strength and a relative density of at least 99%. In the comparative examples, on the other hand, such as those using no surface coating agent, the Si powder and sintering aid aggregated without uniformly dispersing in water with a pH of 6, and the Si powder was oxidized while being milled. As a result, only $Si_3N_4$ sintered bodies with poor relative density and flexural strength could be obtained.

EXAMPLE 2

Slurries with a final Si powder mean particle size of 1 μm were prepared in the same manner as Example 1, except that a nitrate containing $y^{3+}$ ions was used as the surface coating agent, and the amounts used, the slurry pH, and the amounts of water added were changed as shown in Table 2. $Si_3N_4$ sintered bodies were prepared from the slurries in the same manner as in Example 1. Table 2 gives the results of the evaluation of the properties.

TABLE 2

| Sample | Amount Of $Y^{3+}$ Added (wt %) | Amount of water added (wt %) | pH | Final Si powder Surface oxygen content (wt %) | $Si_3N_4$ sintered body Density (%) | $Si_3N_4$ sintered body Strength (MPa) |
|---|---|---|---|---|---|---|
| 16* | 0.01 | 70 | 6 | 5.0 | 85 | 750 |
| 17 | 0.05 | 70 | 6 | 2.0 | 98 | 1000 |
| 18 | 5 | 70 | 6 | 1.2 | 99 | 1150 |
| 19 | 10 | 70 | 6 | 1.2 | 99 | 1150 |
| 20* | 15 | 70 | 6 | 1.2 | 85 | 750 |
| 21* | 4 | 48 | 6 | 1.2 | 70 | 450 |
| 22 | 4 | 50 | 6 | 1.2 | 98 | 1100 |
| 23 | 4 | 75 | 6 | 1.2 | 99 | 1150 |
| 24 | 4 | 90 | 6 | 1.2 | 99 | 1150 |
| 25* | 4 | 92 | 6 | 1.2 | 80 | 750 |
| 26* | 4 | 70 | 2.8 | 1.2 | 70 | 450 |
| 27 | 4 | 70 | 3 | 1.2 | 99 | 1150 |
| 28 | 4 | 70 | 5 | 1.2 | 99 | 1150 |
| 29* | 4 | 70 | 8.5 | 3.0 | 90 | 750 |

(Note)
Samples with asterisks are comparative examples.

The results of Table 2 show that the samples of the present invention gave $Si_3N_4$ sintered bodies with a high relative density and flexural strength. When the amount of the surface coating agent, the amount of water, or the pH were outside the ranges stipulated in the present invention, however, the powders were inadequately dispersed, or the Si powder was considerably oxidized while milled, resulting in $Si_3N_4$ sintered bodies with unsatisfactory flexural strength.

EXAMPLE 3

Slurries were prepared in the same manner as in Example 1 (using a nitrate containing $y^{3+}$ as the surface coating agent) except that the extent to which the Si powder was milled in the aqueous solvent (final Si powder mean particle size), the type and total amount of the sintering aid, and the amount of organic binder for molding were changed as shown in Table 3. $Si_3N_4$ sintered bodies were prepared from the thus obtained slurries in the same way as in Example 1. The properties of the slurries and $Si_3N_4$ sintered bodies were assessed in the same manner as above, with the results given in Table 3.

TABLE 3

| Sample | Final Si powder Particle size (μm) | Sintering aid Type | Sintering aid wt % | Amount of binder (wt %) | $Si_3N_4$ sintered body Density (%) | $Si_3N_4$ sintered body Strength (MPa) |
|---|---|---|---|---|---|---|
| 30 | 0.05 | $Y_2O_3$ + MgO | 10 | 5 | 97 | 750 |
| 31 | 0.1 | $Y_2O_3$ + MgO | 10 | 5 | 99 | 1250 |
| 32 | 0.8 | $Y_2O_3$ + MgO | 10 | 5 | 99 | 1350 |
| 33 | 5 | $Y_2O_3$ + MgO | 10 | 5 | 99 | 1100 |
| 34 | 10 | $Y_2O_3$ + MgO | 10 | 5 | 99 | 1000 |
| 35* | 15 | $Y_2O_3$ + MgO | 10 | 5 | 90 | 650 |
| 36* | 1 | None | 0 | 5 | 90 | 650 |
| 37 | 1 | $CeO_2$ + MgO | 0.2 | 5 | 98 | 1050 |
| 38 | 1 | $Y_2O_3$ + CaO | 5 | 5 | 99 | 1250 |
| 39 | 1 | $Yb_2O_3$ + SrO | 10 | 5 | 99 | 1250 |
| 40 | 1 | $Nd_2O_3$ + $La_2O_3$ | 10 | 5 | 99 | 1350 |
| 41 | 1 | $Sm_2O_3$ + $Al_2O_3$ | 10 | 5 | 99 | 1450 |
| 42 | 1 | $Y_2O_3$ + $MgAl_2O_4$ | 20 | 5 | 99 | 1050 |
| 43* | 1 | $Ce_2O_3$ + $Sr_2CO_3$ | 22 | 5 | 88 | 750 |
| 44 | 1 | $Y_2O_3$ + MgO | 10 | 0 | 90 | 850 |
| 45 | 1 | $Y_2O_3$ + MgO | 10 | 0.01 | 92 | 950 |

TABLE 3-continued

| Sample | Final Si powder Particle size (μm) | Sintering aid Type | wt % | Amount of binder (wt %) | $Si_3N_4$ sintered body Density (%) | Strength (MPa) |
|---|---|---|---|---|---|---|
| 46 | 1 | $Y_2O_3$ + MgO | 10 | 0.05 | 98 | 1050 |
| 47 | 1 | $Y_2O_3$ + MgO | 10 | 4 | 99 | 1150 |
| 48 | 1 | $Y_2O_3$ + MgO | 10 | 6 | 99 | 1150 |
| 49 | 1 | $Y_2O_3$ + MgO | 10 | 8 | 90 | 750 |

(Note)
Samples with asterisks are comparative examples.

The above results show that $Si_3N_4$ sintered bodies with excellent mechanical properties in terms of a flexural strength of 800 MPa or higher could be obtained by controlling the final Si powder mean particle size to 10 μm or less (preferably 0.1 to 2 μm), the amount of the sintering aid added to a range of 0.2 to 20 wt % and the amount of the organic binder added for molding such as dry molding to within a range of 0.01 to 6 wt%.

EXAMPLE 4

The method of the present invention in Example 1 was compared to methods where the Si powder was pre-milled in an organic solvent, or was milled and oxidized in air in separate steps, as described in Japanese Patent 2686248 and U.S. Pat. No. 5,387,562. The properties of the $Si_3N_4$ sintered bodies and their manufacturing costs are compared in Table 4 below.

That is, in method A of the present invention, $Si_3N_4$ sintered bodies were prepared in the same manner as in Example 1 except that a Si powder with a mean particle size of 12 μm was used as the starting material to produce a final milled Si mean particle size of 1 μm in the slurry. On the other hand, in comparative method B according to Japanese Patent 2686248, the starting material Si powder was obtained by oxidizing a commercially available Si powder with a mean particle size of 2.8 μm in the atmosphere, and then controlling the oxide film thickness of the surface to between 1.5 and 15 nm. 70 wt % of water, 10 wt % of a sintering aid, 5 wt % of an organic binder, and aluminum polycarboxylate as a dispersion agent were added to the starting material Si powder, the pH was adjusted to 8.5, and the powder was mixed in a ball mill to give a slurry wherein the final Si powder mean particle size was 2.8 μm.

TABLE 4

| Method | Starting Material Si powder Powder unit | Oxidation Step | pH | $Si_3N_4$ sintered body Density (%) | Strength (MPa) | Mfg. cost |
|---|---|---|---|---|---|---|
| A | a | not needed | 6 | 99 | 1100 | b |
| B | 8 × a | 600° C. × 5 hr | 8.5 | 98 | 980 | 7 × b |

The above results show that the preparation of a slurry composition in accordance with the method of the present invention for milling and mixing Si powder in an aqueous solvent afforded a $Si_3N_4$ sintered body with properties equal to or greater than those obtained in conventional methods, at a lower manufacturing cost.

The present invention provides a slurry Si-base composition suitable for the manufacture of $Si_3N_4$ sintered bodies and an inexpensive manufacturing method, wherein the Si powder surface oxidation can be suppressed, despite being milled and mixed in water, and a uniform dispersion of the Si powder and the sintering aid can be obtained. The use of the slurry Si-base composition of the present invention enables the inexpensive manufacture of $Si_3N_4$ sintered bodies with better electrical, thermal, and mechanical properties.

What is claimed is:

1. A Si-base composition in the form of a slurry, comprising:
   a Si powder with
      a mean particle size of no more than 10 μm and
      a surface oxygen content of no more than 3 wt %,
   a sintering aid,
   water in an amount of 50 to 90 wt % relative to the total weight of the composition, and
   a surface coating agent in an amount of 0.05 to 10 wt % relative to the Si powder, wherein
      the surface coating agent is trivalent metal ions of at least one selected from the group consisting of Fe, Ga, Sc, Al, Cr, Yb, Sm, Y, In, Pb, V, Ti, Zr, and Hf, and
      the pH of the composition is adjusted to between 3 and 8.

2. A Si-base composition in the form of a slurry, comprising:
   a Si powder with
      a mean particle size of no more than 10 μm and
      a surface oxygen content of no more than 3 wt %,
   a sintering aid,
   water in an amount of 50 to 90 wt % relative to the total weight of the composition, and
   a surface coating agent in an amount of 0.05 to 10 wt % relative to the Si powder, wherein
      the surface coating agent is a Si polymer or polymeric compound with an HLB of no more than 10, and
      the pH of the composition is adjusted to between 3 and 8.

3. A Si-base composition according to claim 1, wherein the sintering aid is a compound of at least one element selected from the group consisting of Ca, Sr, Mg, Al, Y, La, Sm, Nd, Yb, and Ce.

4. A Si-base composition according to claim 3, wherein the content of the sintering aid is 0.2 to 20 wt %, as calculated in terms of oxides thereof, relative to the Si powder.

5. A Si-base composition according to claim 1, wherein the Si-base composition in the form of a slurry furthermore comprises an organic binder.

6. A Si-base composition according to claim 5, wherein the content of the organic binder is 0.01 to 6 wt % relative to the Si powder.

7. A method for producing a Si-base composition in the form of a slurry, comprising:
   adding
      a Si powder,
      a sintering aid, and
      a surface coating agent in an amount of 0.05 to 10 wt % relative to the Si powder,
   to water in an amount of 50 to 90 wt % relative to the total weight of the composition, wherein
      at least one selected from the group consisting of nitrates of, chlorides of, and acetates of at least one element selected from the group consisting of Fe, Ga, Sc, Al, Cr, Yb, Sm, Y, In, Pb, V, Ti, Zr, and Hf is added as the surface coating agent.

8. A method for producing a Si-base composition in the form of a slurry, comprising:

adding
- a Si powder,
- a sintering aid, and
- a surface coating agent in an amount of 0.05 to 10 wt % relative to the Si powder, to water in an amount of 50 to 90 wt % relative to the total weight of the composition, wherein a Si polymer or polymeric compound with an HLB or no more than 10 is added as the surface coating agent.

9. A method of producing a Si-base composition according to claim 7 wherein at least one selected from the group consisting of oxides of, nitrates of, and oxynitrides of at least one element selected from the group consisting of Ca, Sr, Mg, Al, Y, La, Sm, Nd, Yb, and Ce is added as the sintering aid.

10. A method for producing a Si-base composition according to claim 9, wherein the sintering aid is added in an amount of 0.2 to 20 wt %, as calculated in terms of oxides thereof, relative to the Si powder.

11. A method for producing a Si-base composition according to claim 7, wherein an organic binder is also added.

12. A method for producing a Si-base composition according to claim 11, wherein the organic binder is added in an amount of 0.01 to 6 wt % relative to the Si powder.

* * * * *